United States Patent
Kasper et al.

(10) Patent No.: US 11,748,076 B2
(45) Date of Patent: Sep. 5, 2023

(54) METHOD OF GENERATING A REPRESENTATION OF A PROGRAM LOGIC, DECOMPILATION APPARATUS, RECOMPILATION SYSTEM AND COMPUTER PROGRAM PRODUCTS

(71) Applicant: Fujitsu Technology Solutions Intellectual Property GmbH, Munich (DE)

(72) Inventors: Dieter Kasper, Munich (DE); Raimund Mayer, Munich (DE)

(73) Assignee: Fujitsu Technology Solutions GmbH, Munich (DE)

( * ) Notice: Subject to any disclaimer, the term of this patent is extended or adjusted under 35 U.S.C. 154(b) by 123 days.

(21) Appl. No.: 17/436,409

(22) PCT Filed: Feb. 12, 2020

(86) PCT No.: PCT/EP2020/053637
§ 371 (c)(1),
(2) Date: Sep. 3, 2021

(87) PCT Pub. No.: WO2020/177994
PCT Pub. Date: Sep. 10, 2020

(65) Prior Publication Data
US 2022/0147329 A1    May 12, 2022

(30) Foreign Application Priority Data
Mar. 4, 2019   (DE) ............... 10 2019 105 418.4

(51) Int. Cl.
*G06F 8/41* (2018.01)
*G06F 8/53* (2018.01)
(Continued)

(52) U.S. Cl.
CPC ............. *G06F 8/447* (2013.01); *G06F 8/53* (2013.01); *G06F 9/44578* (2013.01); *G06F 9/4552* (2013.01)

(58) Field of Classification Search
CPC ........ G06F 8/447; G06F 8/53; G06F 9/44578; G06F 9/4552
(Continued)

(56) References Cited

U.S. PATENT DOCUMENTS

| 5,860,008 A | 1/1999 | Bradley |
| 5,916,305 A * | 6/1999 | Sikdar ............... G06F 40/205 709/236 |

(Continued)

FOREIGN PATENT DOCUMENTS

| CN | 107 908 955 | 4/1998 |
| JP | H05-134880 A | 6/1993 |
| JP | 2007-249991 A | 9/2007 |

OTHER PUBLICATIONS

Title: Structured generative models of natural source code, author: C Maddison, published on 2014.*
(Continued)

*Primary Examiner* — Chameli Das
(74) *Attorney, Agent, or Firm* — DLA Piper LLP (US)

(57) ABSTRACT

A method of generating a representation of a program logic includes: capturing first program code in a low-level programming language, the program code having been generated by compiling program logic defined in a high-level language; dividing the captured first program code into a sequence of code sections based on a predetermined set of at least partially parameterized code patterns, wherein specific parameter values are captured for each code section and a terminal symbol of an intermediate language is assigned to each code section; assigning the assigned terminal symbols to non-terminal symbols of the intermediate language based (Continued)

on a context-free grammar, wherein a totality of the assigned non-terminal symbols describes the program logic of the first program code in the intermediate language; and generating a representation of the program logic independent of the first processor architecture based on the associated non-terminal symbols of the intermediate language and the detected parameter values.

13 Claims, 7 Drawing Sheets

(51) Int. Cl.
*G06F 9/445* (2018.01)
*G06F 9/455* (2018.01)

(58) Field of Classification Search
USPC .......................................................... 717/116
See application file for complete search history.

(56) References Cited

U.S. PATENT DOCUMENTS

| | | | |
|---|---|---|---|
| 8,630,965 B2* | 1/2014 | Sawides | G06N 7/00 706/13 |
| 2003/0070144 A1* | 4/2003 | Schnelle | G06F 16/86 715/239 |
| 2007/0022414 A1* | 1/2007 | Bird | G06F 8/427 717/136 |
| 2009/0007085 A1 | 1/2009 | Owen et al. | |
| 2009/0083265 A1* | 3/2009 | Michailov | G06F 16/90344 |
| 2010/0037213 A1* | 2/2010 | Meijer | G06F 8/427 717/144 |

OTHER PUBLICATIONS

Title: Recovering the toolchain provenance of binary code, author: N Rosenblum, published on 2011.*

Cifuentes, C. et al., "Assembly to High-Level Language Translation", *Proceedings of the International Conference on Sofftare Maintenance*, Dec. 1998.

Notice of Reasons for Rejection dated Jan. 10, 2023, of counterpart Japanese Patent Application No. 2021-552541, along with an English.

G. Nolan, "Decompiling Java," 1st Edition, O'Reilly Japan Inc., pp. 135, 136, 143 and 144, ISBN: 978-4-87311-449-1, Jun. 2010, along with a Machine translation of pp. 135 and 136 in English.

* cited by examiner

Example 1: parameter array session

CM — BASE(b = 0x4 parlist-f2, cb = 0x6c)

CM — ARRAY_INVAL(a = 0x5 parlist-f2_o_000[], b = 0x4 parlist-f2, o = 0x0, 8 = 0xffffffff)

CM — ARRAY_BCDIDX(a = 0x5 parlist-f2, o = 8, i = 7, t = 0xc350, x = 1, t1 = 0xc2a0, t2 = 0xc2a0, 12 = 4)

CM — BASE(b = 0x6 par3, cb = 0x78)

CM — BCD_COPY(b1 = 0x5 parlist-f2_o_000, o1 = 0x0, b2 = 0x6 par3, o2 = 0x0, l1 = 0x0, l2 = 0x0)

METHOD OF GENERATING A REPRESENTATION OF A PROGRAM LOGIC, DECOMPILATION APPARATUS, RECOMPILATION SYSTEM AND COMPUTER PROGRAM PRODUCTS

TECHNICAL FIELD

This disclosure relates to a method of generating a representation of a program logic in an intermediate language based on first program code in a low level programming language for a first processor architecture, an apparatus that decompiles first program code for a processor of a first processor architecture, a recompilation system that translates first program code of a first processor architecture into executable program code for a second processor architecture, and computer program products.

BACKGROUND

From the late 1950s to the end of the 1980s, a large number of so-called mainframe computers with associated processor architectures were developed. Because of the relatively high cost of their hardware, such computer systems were usually managed centrally in a computer centre. In the process, different computer programs for running different applications shared the resources of the same computer system.

With increasing miniaturization and the associated cost reduction in the manufacture of computer systems, as well as further technical advances, particularly in the virtualization of computer systems and their resources, the centralized approach of the mainframe architecture at the time has largely become obsolete. Nevertheless, a relatively large number of specialized computer programs continue to be used, particularly in the areas of accounting, tax administration and complex control systems that were originally developed to run on such a mainframe system.

In many instances, the original source code of the computer program is no longer available or cannot be determined with reasonable effort. Such computer programs are either executed on still functioning or replicated mainframe systems with the original architecture or, increasingly, using virtualization systems, on a virtual system that emulates the architecture of such a mainframe system.

A relatively widespread mainframe computer architecture is based on the IBM System/360 (S/360), the IBM System/370 (S/370) and the IBM System/390 (S/390) respectively. A large number of programs exist for these processor architectures. Nowadays, these are typically executed on computer systems with processors of the so-called x86 architecture from Intel. To compensate for the differences between the two processor architectures, the operation of an S/360, S/370 or S/390 system with an associated processor is typically emulated on a processor with an x86 architecture.

An emulator executes a computer program, for example, in the form of so-called S/390 binary code, by interpreting each individual machine instruction of the S/390 binary code. Such an interpretation is conceptually relatively easy to implement, as it is independent of any underlying program logic of the computer program and only requires an analysis of the semantics of the machine instructions of a source platform. For example, registers and memory addresses of the S/390 architecture are mapped to registers and memory addresses of the x86 architecture or another target platform.

Due to the interpretation of the S/390 binary code at runtime as well as the differences in the underlying CISC processor architectures, there are considerable losses in efficiency. For example, there is so-called "pumping" or bloating of the machine code, for example, because the byte order of coded numerical values used must be converted from Big- to Little-Endian, the register widths of the existing registers differ, individual bits must be masked during memory accesses, results of conditions must be temporarily stored and additional registers must be mapped into an area of main memory and reloaded from there. This additional work does not stem from the semantics of the original computer program in the high-level language, but solely from its original technical implementation on the source platform. The technical causes of these efficiency losses are extremely complex and therefore cannot generally be avoided.

As a result, interpreting the S/390 binary code on the target platform typically requires significantly more processor cycles than executing the S/390 binary code on the source platform. In addition, it is not possible to extend or maintain the computer program in this way, for example, to eliminate known errors ("bugs").

Figure 1:
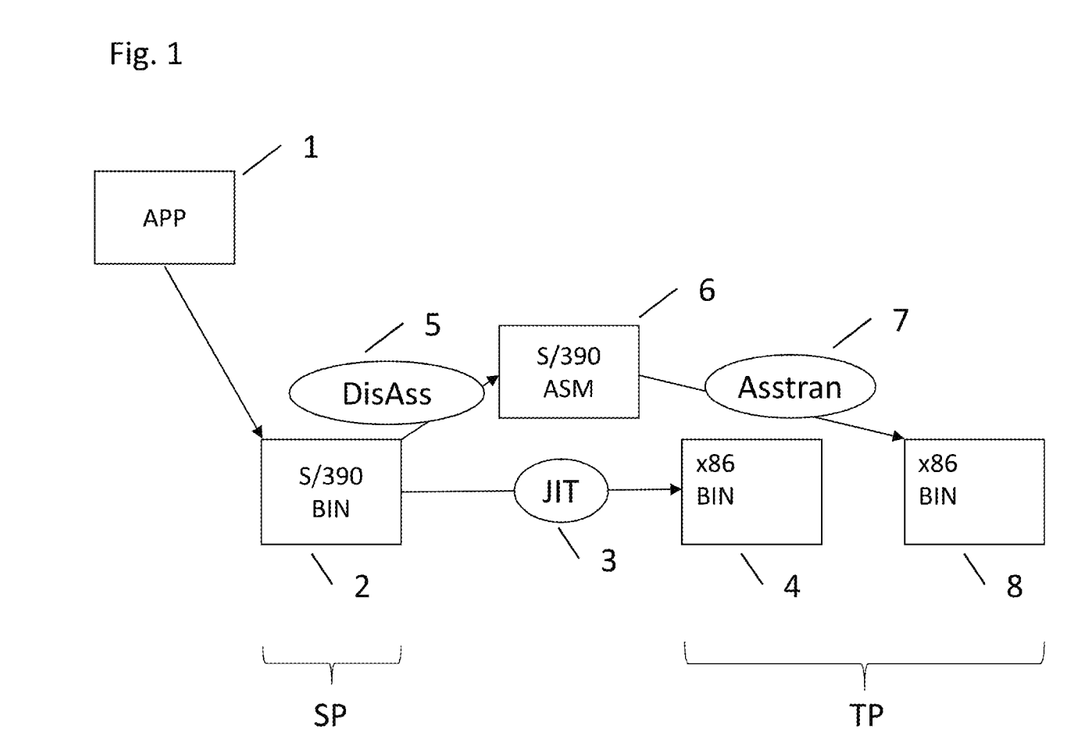
FIG. 1 is a schematic representation of known code translation methods.

FIG. 1 shows two improved approaches to running a computer program 1 that is in the form of S/390 binary code 2.

In the first improved approach, a so-called Just-In-Time (JIT) translator 3 translates machine instructions of the S/390 binary code 2 at runtime into a corresponding sequence of machine instructions of a target platform TP and caches the translated sequence as the first x86 binary code 4. If the same machine instruction of the S/390 binary code 2 is executed again, usually no new translation takes place. Instead, the corresponding part of the cached first x86 binary code 4 is re-executed, which significantly reduces the translation effort and speeds up the execution of the computer program 1.

However, there is also the problem of pumping so that the execution of the first x86 binary code 4 on the target platform TP typically requires significantly more processor cycles than the execution of the S/390 binary code 2 on the source platform SP. Furthermore, that approach is only applicable to computer programs 1 that meet a number of constraints. Such computer programs 1 are referred to as benign or by the term "well behaving". For example, the x86 binary code 4 must be discarded if an operation is detected that could lead to a modification of the S/390 binary code 2. In total, approximately 30 conditions must be monitored by the JIT translator 3 to ensure safe execution of the cached x86 binary code 4. If one of these conditions is violated, the cached x86 binary code 4 is discarded and the original S/390 binary code 2 is reinterpreted as described above. Checking the conditions at runtime causes additional effort and reduces the speed of the generated x86 binary code 4. In addition, it is not possible to extend or improve the computer program 1 in this way either.

A second improved approach consists in first disassembling the binary code 2 by a disassembler 5 into an assembler code 6 for the source platform SP, i.e. for example, into an S/390 assembler program, and subsequently translating the assembler code 6, instruction by instruction, by a translation program 7, for example, the program ASSTRAN of the company Fujitsu Technology Solutions GmbH, into a binary code for the target platform TP, for example, a second x86 binary code 8. Among other things, this approach has the advantage that the effort for analysis and translation is only incurred once and not each time the computer program 1 is re-executed on the target platform TP. Depending on the complexity of the S/390 binary code 2, a slight optimization of the generated x86 binary code 8 is also possible in individual cases, for example, with regard to the use of CPU registers of the target platform TP. Compared to the JIT translation according to the first improved approach, a jump target does not have to be determined anew for each jump instruction.

However, such a translation is only possible under even greater restrictions. For example, it is fundamentally not possible with self-modifying or self-interpreting computer programs. However, the use of self-modifying binary code was quite common in the S/390 architecture. In addition, embedding data in the S/390 binary code 2 can already prevent successful disassembly. In practice, for example, the second improved approach does not work for computer programs generated by a Cobol compiler. Furthermore, pumping of the original S/390 binary code 2 still occurs because it is not the original program logic of computer program 1 that is translated in the high-level language, but only the program logic of S/390 binary code 2. Thus, the second x86 binary code 8 of computer program 1 is also typically more extensive and slower to execute than the original S/390 binary code 2 or its execution on the source platform SP.

It could therefore be helpful to create the possibility of better maintenance and use of computer programs that are available exclusively in a low-level representation close to the machine, for example, as binary code, and among other things, accelerate the execution of such computer programs on another computer platform.

SUMMARY

We provide a method of generating a representation of a program logic in an intermediate language, including: capturing first program code in a low level programming language for a first processor architecture, the first program code implementing a program logic and having been generated by compiling the program logic defined in a high level language with a compiler, dividing the captured first program code into a sequence of code sections based on a predetermined set of at least partially parameterized code patterns specific to the compiler, wherein for each code section, specific parameter values for each parameter of a corresponding parameterized code pattern are captured and a terminal symbol of the intermediate language is assigned to each code section, assigning the terminal symbols assigned to the sequence of code sections to non-terminal symbols of the intermediate language based on a context-free grammar of the intermediate language, wherein a totality of the assigned non-terminal symbols describes the program logic of the first program code in the intermediate language, and generating a representation of the program logic independent of the first processor architecture based on the assigned non-terminal symbols of the intermediate language and the acquired parameter values.

We also provide a decompilation apparatus including: a matcher that divides captured first program code for a processor of a first processor architecture into a sequence of code sections based on a predetermined set of at least partially parameterized code patterns, wherein the first program code implements a program logic and has been generated by compiling a computer program defined in a high-level language by a compiler, and the matcher captures for each code section specific parameter values for each parameter of a corresponding parameterized code pattern and assigns to each code section a terminal symbol of an intermediate language, and a parser or a bottom-up parser that reduces a sequence of terminal symbols assigned to the sequence of code sections to non-terminal symbols of the intermediate language, wherein a totality of the non-terminal symbols generated by the parser by reduction describes the program logic of the computer program in the intermediate language.

LIST OF REFERENCE SIGNS

1 Computer program
2 S/390 binary code
3 JIT translator
4 first x86 binary code
5 Disassembler
6 (disassembled) assembler code
7 Translation program
8 second x86 binary code
9 Decompiler
10 Generic program code
11 Analysis program
12 x86 code generator
13 third x86 binary code
14 Code optimizer
30 Method
40 Recompiling system
41 Machine code
42 Byte stream
43 Text file
44 Sample parser
45 Matcher
46 Token
47 LR parser
48 Hierarchical representation (of the program logic)
50 Assembler code (for the target platform)
51 Executable assembler program
52 Assembler
53 Executable code (for the target platform)
60 Syntax tree
61 Allocation expression
62 Addition expression
63 Variable assignment
64 further expression
65 Constant
66 Factor
67 Variable retrieval
68 Assembler code fragment
L1 Binary code level
L2 Assembler code level
L3 Code optimization level
L4 Intermediate language level L5 High language level
CM Code pattern
IL Intermediate language
SP Source platform
TP Target platform
PL Program logic
TS Terminal symbol
NTS Non-terminal symbol

DETAILED DESCRIPTION

We provide a method of generating a representation of a program logic in an intermediate language, comprising:

capturing first program code in a low level programming language for a first processor architecture, wherein the first program code implements a program logic and has been generated by compiling the program logic defined in a high level language with a compiler;

dividing the detected first program code into a sequence of code sections based on a predetermined set of at least partially parameterized code patterns specific to the compiler, wherein for each code section specific parameter values for each parameter of a corresponding parameterized code pattern are captured and a corresponding terminal symbol of the intermediate language is assigned to each code section;

assigning the terminal symbols assigned to the sequence of code sections to non-terminal symbols of the intermediate language based on a context-free grammar of the intermediate language, wherein a totality of the assigned non-terminal symbols describes the program logic of the first program code in the intermediate language; and generating a representation of the program logic independent of the first processor architecture based on the associated non-terminal symbols of the intermediate language and the captured parameter values.

By the above steps, a program logic of a computer program based on program code of a low-level programming language can be recovered for a first processor architecture. The term "program logic" refers to the semantics of the computer program, i.e. the algorithm for data processing expressed by the program in the high-level language. The recovery of the program logic is made possible, among other things, by taking into account code patterns of the compiler originally used to generate the first program code. In this process, the program logic is not represented in the originally used high-level language, but in an intermediate language that is not specific to a particular high-level language or machine architecture.

In general, it is not possible to recover the source code of a computer program in a high-level language based on assembly or binary code of the compiled computer program. However, we recognized that at least its program logic can be recovered provided that the compiler used to generate the assembly or binary code and/or the programming language used to generate it are known or at least containable. For example, a program logic can be reconstructed if it is known which code patterns were used by a compiler to code certain elements of a computer program originally coded in a high-level language. Such code patterns can be determined, for example, by analysing a so-called code generator back-end of a compiler.

By these code patterns, it is possible, for example, to identify parameters contained in the first program code. The assignment of specific parameter values for each code section makes it possible, for example, in particular to distinguish between code patterns that are similar but directed at different variables or expressions such as different or nested program loops with different loop variables.

We also recognized that the COBOL programming language was very often used to compile computer programs for mainframe architectures in about 80 percent of the programs examined, and that the original COBOL program code was translated into a binary code representation of the computer program by using only a few linear compilers without code optimization. Taking into account the known peculiarities of the compiler(s) used, for example, known COBOL compilers, it is therefore possible to obtain a representation of a program logic implemented by the computer program in an intermediate language. Although this representation does not contain the complete source code of the high-level language originally used for programming such as, for example, the variable names or comments used by the programmer, it permits, among other things, maintenance of the computer program as well as automatic, static generation of efficient binary code for a desired target platform.

By generating a representation of the predetermined program logic in an intermediate language as described, parts of the first program code that are specific, for example, to the original target platform but cannot be efficiently mapped on the new target platform can be separated from the actual program logic, thus enabling the computer program to be translated into efficient code for the target platform.

In the step of dividing, the code sections of the first program code may be compared by pattern matching with the predetermined set of at least partially parameterized code patterns specific to the compiler. A corresponding terminal symbol is assigned only if a consistent assignment of parameter values for each parameter of a corresponding parameterized code pattern is possible for the examined code section. Such a parameter-based pattern matching prevents possible misassignments during the analysis of the first program code. For example, it can be used to distinguish a sequence of machine instructions that happens to correspond to a predetermined code pattern, but actually does not fulfil any related functionality and was not generated by a compiler, from an equivalent sequence with internally consistent parameter values that was actually generated by a code generation module of a compiler.

At least one context-dependent condition for a non-terminal symbol of the intermediate language may be checked in the step of assigning based on the parameter values detected in the step of dividing, and a possible assignment to the non-terminal symbol may be rejected as incorrect if the at least one context-dependent condition is not fulfilled by the detected parameter values of the corresponding code sections. The assigned parameter values can also be used when assigning the individual terminal symbols to non-terminal symbols, i.e. more complex expressions of the intermediate language to prevent possible incorrect assignments. For example, an up-counter of a loop variable can be assigned to the correct program loop of a multitude of possibly nested program loops. Together, the conditions for all assignment rules of the non-terminal symbols of the intermediate language that depend on the assigned parameters and are thus context-dependent, form a declarative system of rules to be followed in the recovery of the program logic. An assignment according to a possible assignment rule of the intermediate language is only permissible if the corresponding conditions are observed by the concretely parameterized non-terminal symbols.

In the step of assigning, a sequence of terminal symbols assigned to the sequence of code sections may be converted by a parser, for example, a bottom-up parser into a hierarchical representation, for example, a syntax tree of the program logic. The higher-level elements of the hierarchical representation or the inner nodes of the syntax tree correspond to the non-terminal symbols of the intermediate language. The exclusively lower-level elements of the hierarchical representation or the leaves of the syntax tree correspond to terminal symbols of the intermediate language.

In other words, the terminal symbols of the intermediate language are the atomic elements of a high-level language and the non-terminal symbols are program constructs, especially composite program constructs. Program constructs of a high-level language include, for example, the evaluation of expressions and conditions, the running of program loops and the calling of subroutines.

The use of such a parser in conjunction with a hierarchical representation enables a simple assignment of different atomic elements to more complex, generic program constructs by reduction rules of a grammar. Such a representation can be created, for example, by a bottom-up parser, for example, an LR parser, using a context-free grammar (also known as a type-2 grammar in the so-called Chomsky hierarchy) of the program constructs of the intermediate language.

The non-terminal symbols of the intermediate language may be characteristic of a plurality of imperative higher programming languages such as COBOL, FORTRAN, S3, Algol and/or C. All of the above programming languages use similar program constructs such as a check of a condition, a conditional execution of a program section, an evaluation of an arithmetic expression, an assignment of a value to a variable, a call to another program section with optional passing of one or more parameter values or references, for example, a call to a subroutine and a return from it, and a traversal of a program loop. Such program constructs can be realized at a lower level, for example, via conditional jumps or jumps in conditional code. By exploiting background knowledge of the programming languages particularly commonly used to create computer programs, the retrieval of the sought-after program logic into a suitable intermediate language can be simplified.

The step of generating second program code may be generated in a low level programming language for a second processor architecture based on the associated non-terminal symbols of the intermediate language. In this example, program steps are executed according to the program logic defined in the high level language upon execution of the second program code on a processor having the second processor architecture. This example is particularly useful for automatically generating executable code for a given target platform such as the Intel x86 architecture.

Controlled second program code for the second processor architecture may be generated in the step of generating. Based on the representation in the intermediate language, improvement of the generated program code is possible, for example, by using data types selected for the target platform or on the basis of a data flow analysis of the program logic, which leads to a further acceleration in an execution of the generated second program code.

We further provide a decompilation apparatus, a recompilation system and computer program products.

The computer program product may comprise program code that executes the program code stored in a memory of at least one computer system on a processor of the computer system, wherein the program code of the computer program product performs the following steps:

dividing captured first program code for a processor of a first processor architecture into a sequence of code sections based on a predetermined set of at least partially parameterized code patterns, wherein the first program code implements a program logic and has been generated by compiling a computer program defined in a high-level language by a compiler, wherein specific parameter values for each parameter of a corresponding parameterized code pattern are captured during the dividing for each code section and a terminal symbol of an intermediate language is assigned to each code section; and assigning the terminal symbols assigned to the divided sequence of code sections to non-terminal symbols of the intermediate language based on a context-free grammar of the intermediate language, wherein a totality of the assigned non-terminal symbols describes the program logic of the computer program in the intermediate language.

A computer program product may comprise program code, the program code having been generated by a method of any of the examples described above or by the recompilation system according to the examples described above and being suitable for execution on a processor having the second processor architecture.

Further advantages are disclosed in the following description and the appended claims.

Figure 2:
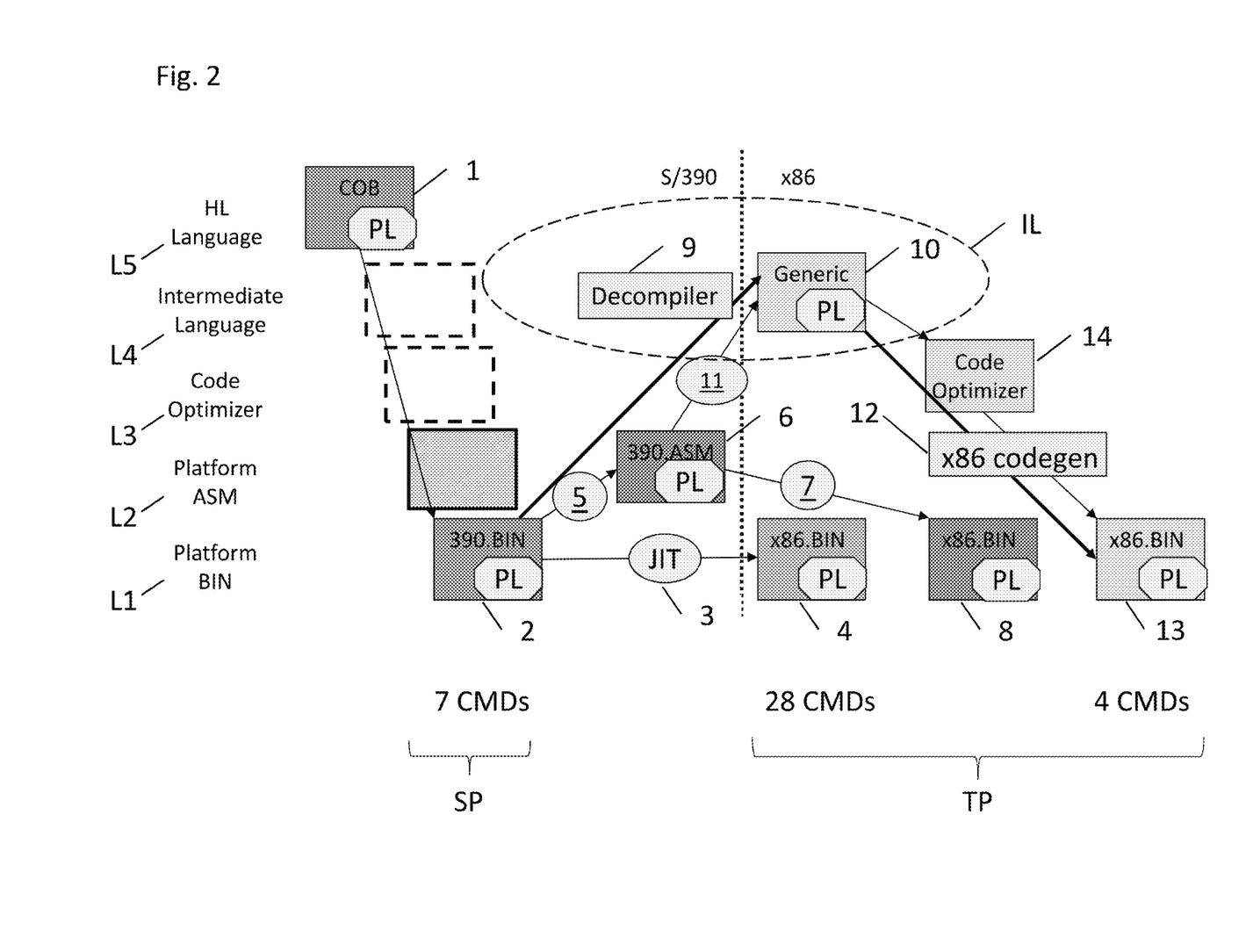
FIG. 2 is a schematic representation of a code translation method.

FIG. 2 schematically shows our method of translating binary code of a source processor architecture into corresponding binary code of a target processor architecture. For better comparability, the possibilities for direct translation of S/390 binary codes 2 in a binary code level L1 into first x86 binary code 4 and indirect translation in an assembly code level L2 into second x86 binary code 8 are shown again in FIG. 2. In addition, a third way is shown, which comprises, for example, generation of a representation of a program logic PL of the computer program 1 on an intermediate language level L4.

In the example, a decompilation apparatus 9 generates generic program code 10 in an intermediate language IL directly from the S/390 binary code 2. The generic program code 10 describes semantics defined by the computer program 1 on a high-level language level L5 in the form of a program logic PL. The procedure used for this is described in detail below with reference to the flow chart in FIG. 3. Alternatively, the generic program code 10 can be generated from disassembled assembly code 6 by an analysis program 11.

The generic program code 10 in the intermediate language IL contains program constructs typical for the group of imperative programming languages such as the evaluation of arithmetic expressions, the definition of program loops or the calling of subroutines as well as individual atomic elements which cannot be further resolved such as access to variables or constants. By such program constructs, programs of several object-oriented programming languages can be expressed in addition to the above-mentioned programming languages. Only programs of purely declarative programming languages cannot be expressed in such an intermediate language.

Based on the recovered program logic PL, machine or assembly code for one or more target platforms TP is generated using a suitable code generation module. In the example, the x86 code generator 12 of the GNU Compiler Collection (GCC) is used to generate third executable x86 binary code 13. In doing so, the code generation module used directly takes into account the capabilities of the processor architecture of the target platform TP. Accordingly, when generating the third binary code 13 on an additional code optimization level L3, a code optimizer 14 can optionally be used, which maps the generic program code 10 in the intermediate language IL in a particularly efficient manner to machine instructions of the processor architecture of the target platform TP.

FIG. 2 shows the performance gain that can be achieved. For example, a single statement of a computer program 1 in a high-level language such as COBOL can be translated into seven machine instructions of the source platform SP, here S/390. A JIT translation into first x86 binary code 4 of the target platform TP results in 28 x86 machine instructions from the seven S/390 instructions. A translation of the same S/390 binary code 2 into the second x86 binary code 8 by the translation program 7 ASSTRAN is not possible, since the S/390 binary code 2 was originally generated by a COBOL compiler. If, as indicated in FIG. 2, a representation of the program logic PL of the S/390 binary code 2 is first recovered in an intermediate language IL and subsequently translated into the third x86 binary code 13 using the x86 code generator 12, the same statement can be implemented by only four machine instructions of an x86 processor of the target architecture. Thus, there is a considerable gain in efficiency in the execution of the computer program 1 on the target platform TP, in the example by a factor of seven compared to the JIT translator 3.

The intermediate language level L4, code optimization level L3 and possibly also an underlying assembly code level L2 shown in FIG. 2, which are used by modern compilers, were not present in many compilers of the 1950s to 1980s. The corresponding intermediate steps or levels L2 to L4 for the creation of the S/390 binary code 2 for the source platform SP are therefore only indicated in FIG. 2 by dashed lines or hatched areas and should be understood conceptually. In fact, many compilers for mainframe systems have translated computer programs 1 from a high-level language such as COBOL directly into binary code of a target platform TP, for example, the S/390 binary code 2. Typically, linear compilers without code optimization were used, which produced a relatively inefficient binary code. However, the binary code generated in this way is particularly easy to analyze, which simplifies the reconstruction of the program logic PL encoded therein as explained below.

The following describes a translation, referred to as a "recompilation", of a computer program 1 originally created in the COBOL programming language and compiled into S/390 binary code 2 into corresponding x86 binary code 13. This disclosure is not limited to the aforementioned source and target platforms, the COBOL programming language or the code patterns and symbols of the intermediate language IL described below. Rather, it is transferable to a variety of other platforms such as the ICL series 39, IBM S/360 or S/370, the FORTRAN, S3, Algol or C programming languages and associated code patterns, and intermediate languages with other grammars.

Figure 3:
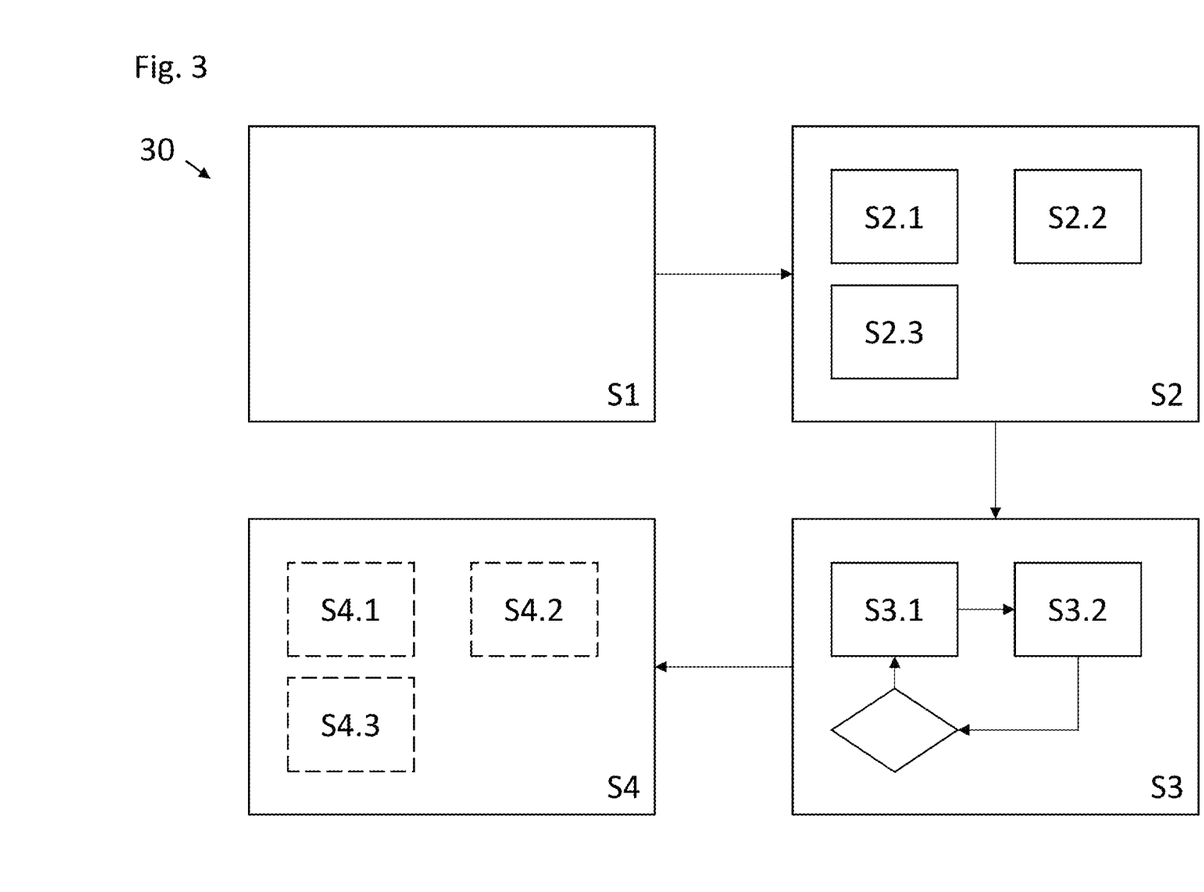
FIG. 3 is a flowchart of a method of generating a representation of a program logic.

FIG. 3 shows a flowchart of a method 30 of generating a representation of a program logic PL of an S/390 binary code 2 in an intermediate language IL and subsequently generating a third x86 binary code 13 based on this representation. The method is performed by a recompilation system 40 shown schematically in FIG. 4.

Figure 4:
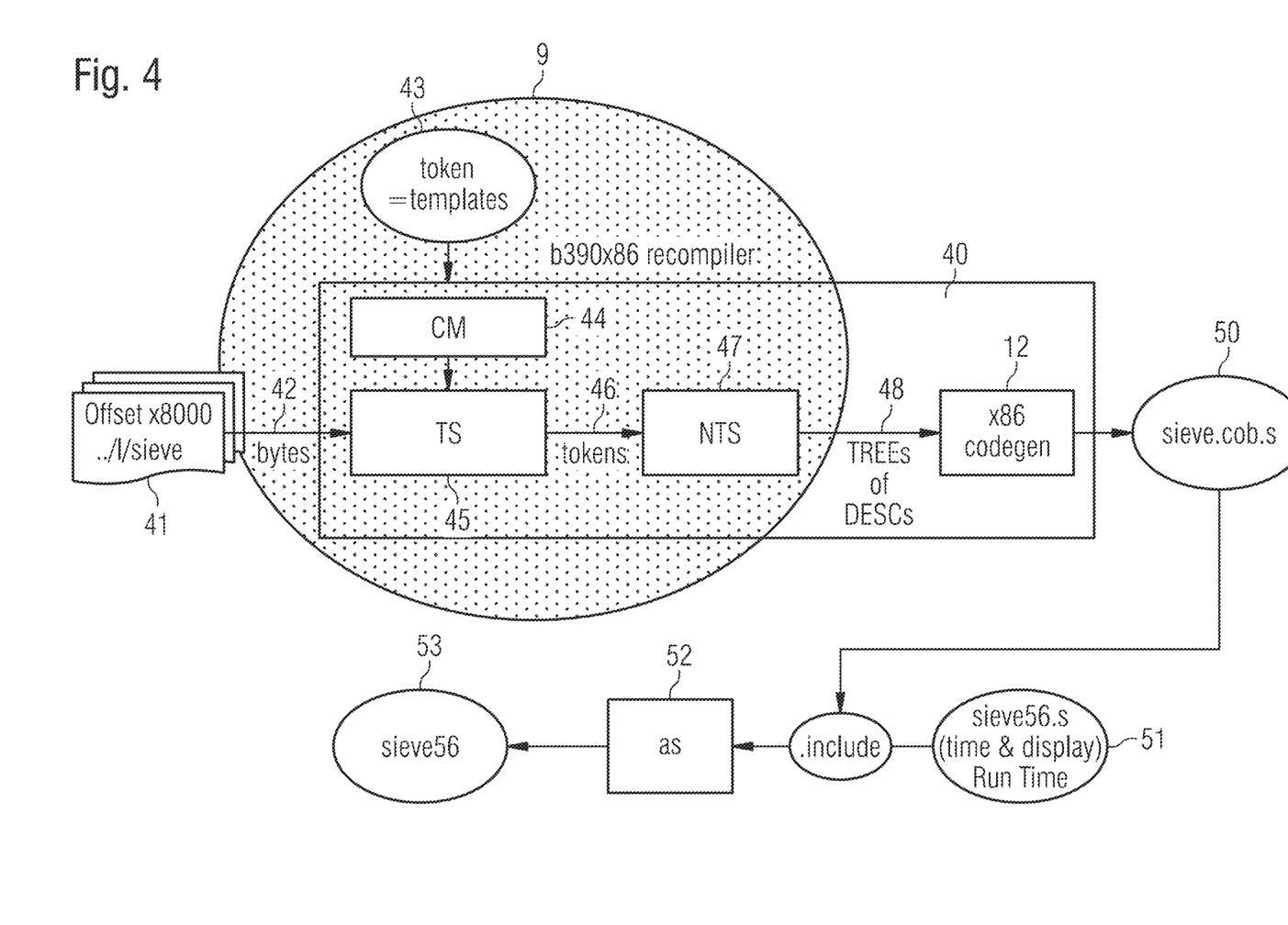
FIG. 4 is a schematic representation of a decompilation device and a recompilation system.

The recompilation system 40 comprises executable program code of a computer program stored in a memory of a computer system and executable by a processor of the computer system. The computer program may be, for example, a computer program for the source platform SP, for the target platform TP, or for another platform. The computer program may also be executed on a distributed system in which one or more blocks of code are executed on a first computer system and one or more other blocks of code are executed on a second computer system.

In a first step S1 of the method 30, machine code 41 contained in the S/390 binary code 2 and, if necessary, additional so-called inline data contained in the S/390 binary code 2 are acquired. The S/390 binary code 2 was originally generated by compiling a computer program 1 in the high-level COBOL language. However, the COBOL source code is no longer available.

In the example, an address offset value x8000 is first specified as the start address of a first instruction of a machine code portion in an archive file. At this address, the actual machine code 41 begins within the S/390 binary code 2. The S/390 binary code 2 is broken down into a sequence of individual bytes, which is made available to the decompilation device 9 as a so-called byte stream 42.

In a second method step S2, the captured S/390 binary code 2 is divided into a list of code patterns CM with corresponding terminal symbols TS of a formal intermediate language IL. In this example, the code patterns CM assigned to the terminal symbols TS of the intermediate language IL essentially correspond to the code patterns of the compiler used to generate the S/390 binary code 2, for example, a COBOL compiler. An example of such a code pattern CM is a sequence of machine instructions to access a value of a variable stored at a specific address or to load a register with a constant value.

For this division, the actual machine code 41 in the present S/390 binary code 2 must be recognized. For example, it must be determined where machine instructions are located in the S/390 binary code 2. These must be distinguishable from other data contained in the S/390 binary code 2, so-called inline data.

Such an analysis is usually possible if the binary code is disassemblable. For this, a start address of the computer program 1 and the instruction set of the processor of the source platform SP must be known, for example, which length the individual machine instructions have. This is typically given by the number of parameters required to execute each machine instruction and is documented accordingly for known computer platforms.

In contrast to a classical disassembly, in which an existing binary code is assumed to be a sequence of machine instructions, a recognition of machine instructions in the decompilation device 9 described is also possible if the compiler used to generate the binary code has inserted inline data into the generated binary code according to certain patterns, for example, to store large constants. By taking into account known code patterns of the compiler used, it is possible to infer the position and extent of any inline data contained in the binary code. Even a self-modifying binary code can be analyzed, if necessary, if it was generated by known code patterns, for example, to control the passing through of a certain program part at runtime. If the patterns used by the compiler are known, it is possible to determine where machine instructions are contained in the binary code 2 and thus separate them from other data.

For implementation of step S2, a plurality of code patterns CM typical for the originally used compiler are provided in a first sub-step S2.1. The totality of the provided code patterns CM corresponds to a grammar for reverse compiling the S/390 binary code 2 into the terminal symbols TS of the intermediate language IL. At least some of these code patterns CM do not always occur in the S/390 binary code in unchanged form, but are themselves characterized by at least one parameter such as a numerical value, a memory address, or a register. Inline data can also be defined in a code pattern. A pattern matcher is particularly suitable for recognizing such parameterized code patterns CM.

Typically, each compiler uses a code generator and a number of predetermined code patterns CM to generate from an input-side computer program 1 in a high-level language such as COBOL an output-side compiled code in a low-level programming language, for example, binary code or assembly code. The recovery of the program logic PL described below is based on an analysis or knowledge of these code patterns CM.

In the example, the code patterns CM used, including a definition of the parameters contained in the individual code patterns CM, are specified in a text file 43 with the name "token". The code patterns CM contained therein are read into the decompilation apparatus 9 by a pattern parser 44.

The code patterns CM can be provided by analysing a so-called code generator backend of a compiler, wherein the machine code sequences used to implement known atomic elements of a high-level language are provided as patterns. Atomic elements of a high-level language include, for example, constant values and the retrieval or assignment of variable contents. Alternatively, it is also possible to determine corresponding patterns by analysing known computer programs 1, for which preferably both the source code in a high-level language and compiled code in a low-level programming language are available. This procedure is particularly useful if the source code of the compiler itself is no longer available.

Depending on the complexity of the compiler used, a large number of different code patterns CM can be used. In the example of a relatively old COBOL compiler, a number of test programs could be successfully decompiled with 37 code patterns CM determined by analysis. However, it is also possible to consider a much larger number of code patterns CM, especially if these can be derived automatically from a code generation module of a compiler.

In the example, the code patterns CM include, but are not limited to, code patterns for accessing individual variables or arrays, assigning values, for binary coded decimal (BCD) processing typical on the S/390 platform, conditional and unconditional jumps and corresponding returns.

Subsequently, the byte stream 42 of the S/390 binary code 2 generated in step S1 is compared to the code patterns CM detected in step S2.1 to determine associated terminal symbols TS of the intermediate language IL. A so-called matcher 45 that implements a pattern-recognising scanner is used for this purpose. The matcher 45 starts assigning possible code patterns at the predetermined start address of the byte stream 42. In principle, the matcher 45 itself functions like an assembler which, in a first run according to sub-step S2.2, determines a sequence of code patterns CM specifically used and parameterized in the computer program 1. In the first run, the limits of the individual code patterns CM and thus jump targets of jump instructions contained therein are not yet known. Therefore, in the first run, only the corresponding jump labels are generated, but no output of parameterized code patterns CM.

In a subsequent second run, in a sub-step S2., a sequence of code patterns CM used specifically in the computer program 1, possibly parameterized, is generated on the basis of the jump labels generated in the first run. As an output of the matcher 45, a corresponding, appropriately parameterized token 46 is output for each assigned code pattern CM, which token 46 represents the concrete occurrence of an instance of a code pattern CM with the associated parameters in the S/390 binary code 2.

Each part of the incoming byte stream 42 is assigned to a code pattern CM. Most of the code patterns CM used are parameterizable. This results in an output stream of specifically parameterized tokens 46 used in the computer program 1, each of the tokens corresponding to a terminal symbol TS of the intermediate language IL.

The operation of the matcher 45 is explained below on the basis of a code pattern with the name "ARRAY_BCDIDX" for accessing an index variable coded as a BCD number. The code pattern ARRAY_BCDIDX shown below, read by the pattern parser 44, is parameterized by a total of nine parameters a, b, o, l, t, r, t1, t2 and l2. It essentially comprises a sequence of S/390 machine commands whose operands are defined by the above-mentioned parameters. The first column with the so-called mnemonic (e.g. ".PACK") of an assembly language of the corresponding machine instruction (e.g. hexadecimal F2h) represented in the second column is only for better understanding. The matcher 45 searches the S/390 binary code 2 directly for the hexadecimal value of the respective machine instruction.

```
ARRAY_BCDIDX(a, b, o, l, t, r, t1, t2, l2) {
    .PACK       F2 <l2><l> <t2> <b><o>
    .XC         D7 0<7-l2-1> <t1> <t1>
    .MVC        D2 04 <t1+7-l2> <t2>
    .NI         94 FE <t1+7>
    .CVB        4F <r>0 <t1>
    .ST         50 <r>0 <t>
    .A          5A <a>0 <t>
}
```

The expressions in angle brackets are either parameters of the code pattern CM or a combination of parameters with fixed values. The length of the individual parameters in the binary code is implicitly specified in the example by their naming, but can also be specified explicitly.

This and other code patterns CM are read in from the text file 43 by the pattern parser 44, parsed and stored in an array with possible code patterns CM. The pattern parser 44 itself is implemented as a top-down parser, for example, as a recursive descent parser, and supports several hundred code patterns CM in the example. Other parsers or configuration mechanisms can also be used to define the code patterns CM.

If the incoming byte stream 42 of the S/390 binary code 2 corresponds to one of the predetermined code patterns CM, the corresponding code pattern CM is cloned and the concrete parameter values of the byte stream 42 for the parameters contained in the assigned code pattern are stored in the cloned code pattern CM. Thereby, constant values and parameter values of the code patterns must be taken into account. If a parameter occurs several times in a code pattern CM, the corresponding code pattern CM is only assigned if a consistent assignment of all parameters contained therein is possible. The expressions in the angle brackets are evaluated by the matcher 45 and compared to the values at the corresponding position of the byte stream 42. The assignment of the parameters thus represents a solution of the declarative code pattern CM.

For example, the parameter t1 is used a total of five times in the code pattern ARRAY_BCDIDX. In each of these places, the same value for t1 or a value derived from the parameter value t1 for the expressions t1+7−l2 and t1+7 must be in the binary code to be able to assign the code pattern ARRAY_BCDIDX. As another example, for the machine code 41 of the second line, it must be checked whether the first byte of the byte stream 42 after the machine instruction code D7 (.XC) corresponds to four zero bits (corresponding to the hexadecimal value 0h) followed by the binary representation of the result of the expression 7−12−1, using as parameter value for 12, the value read from the byte stream 42 as the first operand of the first machine instruction F2 (.PACK). Furthermore, it is checked whether the value of the third operand corresponds to the value of the second operand, since these two operands should correspond to the same parameter t1 in the code pattern ARRAY_BCDIDX and so on.

If a consistent assignment is not possible, another code pattern CM than the one initially checked may have to be used. If no consistent assignment is possible at all, the input S/390 binary code 2 cannot be divided into code patterns or correspondingly parameterized tokens and thus cannot be successfully decompiled. In this example, the procedure 30 ends with an error. This is particularly the case if the S/390 binary code 2 was not generated by a compiler analyzed for the definition of the code patterns CM, but by another compiler or directly from an assembler program.

The matcher 45 takes advantage of the fact that S/390 binary code 2 generated by known COBOL compilers is typically generated in a single, linear code generation process using fixed code patterns. Thus, conversely, S/390 binary code 2 can also be reassigned to corresponding code patterns CM in a single pass. Accordingly, a unique assignment for S/390 binary code 2 of computer programs originally programmed in COBOL is usually possible by the Matcher 45.

In a step S3 of the method 30, the parameterized tokens 46 corresponding to the terminal symbols TS of the intermediate language IL that have been successfully assigned by the matcher 45 to one of the code patterns CM are assigned to predetermined program constructs corresponding to non-terminal symbols NTS of the intermediate language IL. An assignment must satisfy two separate sets of rules. On the one hand, a reduction of one or more tokens 46 must satisfy the translation rules or constructions of a context-free grammar of the intermediate language IL. On the other hand, the parameters of the parameterized tokens 46 involved must comply with any given declarative rules for a respective construction rule. By the declarative rules, a context dependency of the assignment is established. If an assignment is permissible, the parameter values assigned to the involved terminal symbols TS of the intermediate language IL are passed on to the generated non-terminal symbol.

In language theory, a formal language is defined by a grammar G, which can be described as a 4-tuple G=(NTS, TS, S, P). Here, NTS describes an alphabet of non-terminal symbols, TS an alphabet of terminal symbols TS, S a start symbol and P a set of translation rules or productions describing the translation of a non-terminal symbol NTS into one or more terminal symbols TS or non-terminal symbols NTS.

The intermediate language IL is a self-contained, context-sensitive language whose non-terminals NTS and productions P are not specific to the high-level language used to program computer program 1, but can be applied to a whole class of computer programs generated by compilation in an assembly or binary code representation.

In the decompilation device 9 described, a so-called LR parser 47, a special form of a bottom-up or upward parser, takes over the task of assigning or reducing the terminal symbols TS already recognized by the matcher 45 to composite non-terminal symbols NTS of the intermediate language IL. In contrast to known parsers for context-free grammars, the context dependency of the non-terminal symbols NTS to be assigned is exploited here.

The context of the individual non-terminal symbols NTS is checked in the example in the step of reducing based on checking the parameter values associated with the terminal symbols TS using declarative rules. For example, a definition of the non-terminal symbols NTS may specify which parameters must match the parameters of the code patterns CM recognized by the matcher 45 to reduce different terminal symbols TS or non-terminal symbols NTS to a higher-level non-terminal symbol NTS such as running a program loop with a count variable. The rules to be checked are fixedly implemented in the program code of the LR parser 47. Alternatively, it is also possible to read the rules to be checked into the parser 47 in the form of a configuration file at start-up.

The syntax tree formed from the parameterized tokens 46 or terminal symbols TS and the program constructs or non-terminal symbols NTS of the grammar of the intermediate language IL represents in its entirety the program logic PL underlying the original computer program 1. The root of the syntax tree corresponds to the start symbol S of the grammar, from which the complete program logic PL can be derived. In other words, for each concrete computer program 1 there is a corresponding syntax tree corresponding to a word of the intermediate language IL.

For implementation of step S3, the LR parser 47 selects in a first sub-step S3.1 a non-terminal symbol NTS according to the grammar G of the intermediate language IL which, according to an associated translation rule P, appears suitable to substitute the previously determined tokens 46 and/or already successfully assigned non-terminal symbols NTS. In doing so, the LR parser 47 tries to find a match as long as possible between a sequence of tokens 46 provided by the matcher 45 and the currently selected non-terminal symbol NTS of the intermediate language IL.

In a subsequent sub-step S3.2, it is checked whether the parameters of the tokens 46 assigned in sub-step S3.1 correspond to the declarative rules of the selected non-terminal symbol NTS or the associated production rule. If this is the case, an applicable program construct has been determined.

Otherwise, the LR parser 47 jumps back to substep S3.1 and tries to find another sequence of symbols that can be translated into another possible non-terminal symbol NTS. The assignment of the parameters of the involved tokens 46 is then checked again in sub-step S3.2 until finally a successful assignment is found or the procedure terminates with an error because no non-terminal symbol NTS could be successfully assigned according to the rules of the grammar.

The substeps S3.1 and S3.2 are repeated recursively until the sequence of symbols has been traced back to the start symbol S of the grammar, which symbolically corresponds to the program logic PL of the computer program 1. If this is possible, the computer program 1 can be decompiled. Otherwise, the computer program 1 is not decompilable and the method 30 terminates with an error.

In the following, the operation of the LR parser 47 is further explained by examples. For this purpose, FIGS. 5A and 5B graphically illustrate two examples of a check of an assignment of non-terminal symbols NTS to parameterized terminal symbols TS according to a sequence of tokens 46 by arrows. The arrows show dependencies on parameters of the terminal symbols TS involved.

Figure 5A:
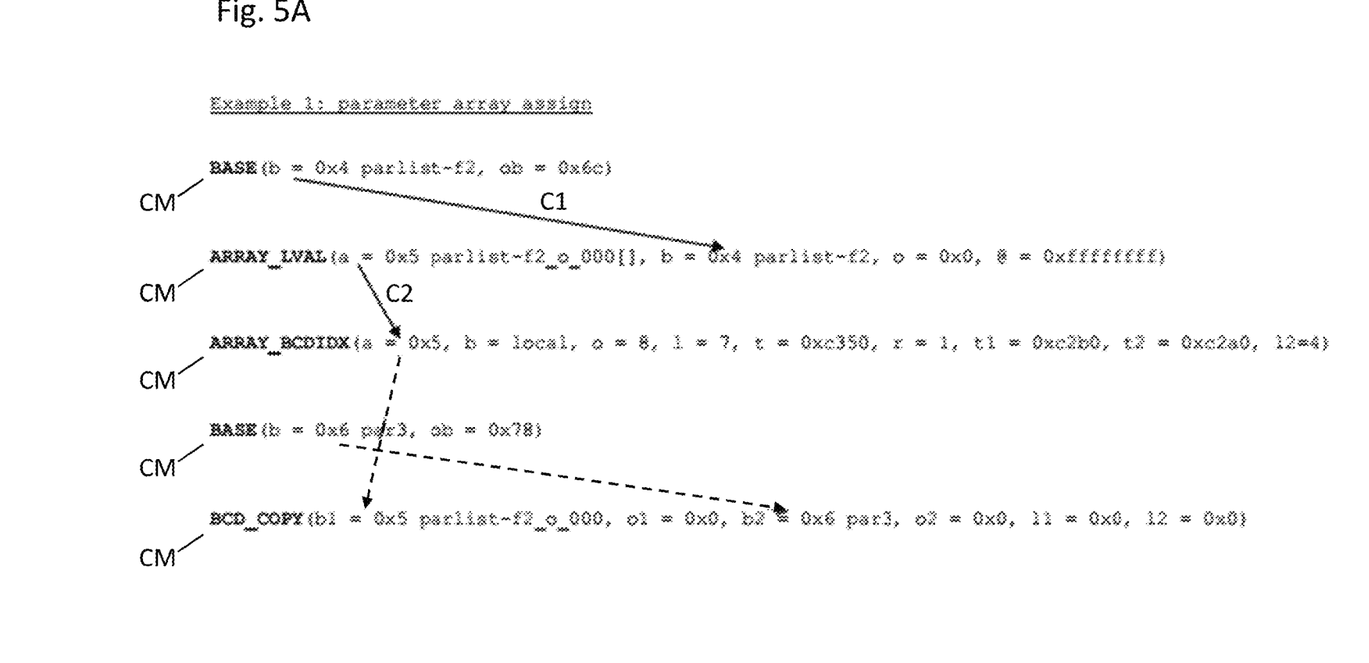
FIGS. 5A and 5B are Exemplary assignments of parameterized tokens to various program constructs.

In the example according to FIG. 5A, a total of five parameterized tokens 46 corresponding to a sequence of five corresponding parameterized code patterns BASE, ARRAY- _LVAL, ARRAY_BCD_IDX, BASE, BCD_COPY are assigned to a program construct "parameter array assign". According to a first condition C1, the value of the first parameter b of the first parameterized code pattern BASE must match the value of the second parameter b of the parameterized code pattern ARRAY_LVAL. Likewise, the value of the first parameter a of the parameterized code pattern ARRAY_LVAL must match the value of the first parameter a of the parameterized code pattern ARRAY_BCDIDX according to a second condition C2. The expression "a=0x5 parlist-f2_o_000[ ] means, for example, that a parameter list with offset 0 is stored in register a at address 0x5.

These dependencies shall be verified by the LR parser 47. Equivalently, the mapping according to the first parameter a of the parameterized code pattern ARRAY_BCDIDX must match the first parameter b1 of the parameterized code pattern BCD_COPY and the mapping according to the first parameter b of the second parameterized code pattern BASE must match the third parameter b2 of the parameterized code pattern BCD_COPY (indicated by dashed lines in FIG. 5A).

Figure 5B:
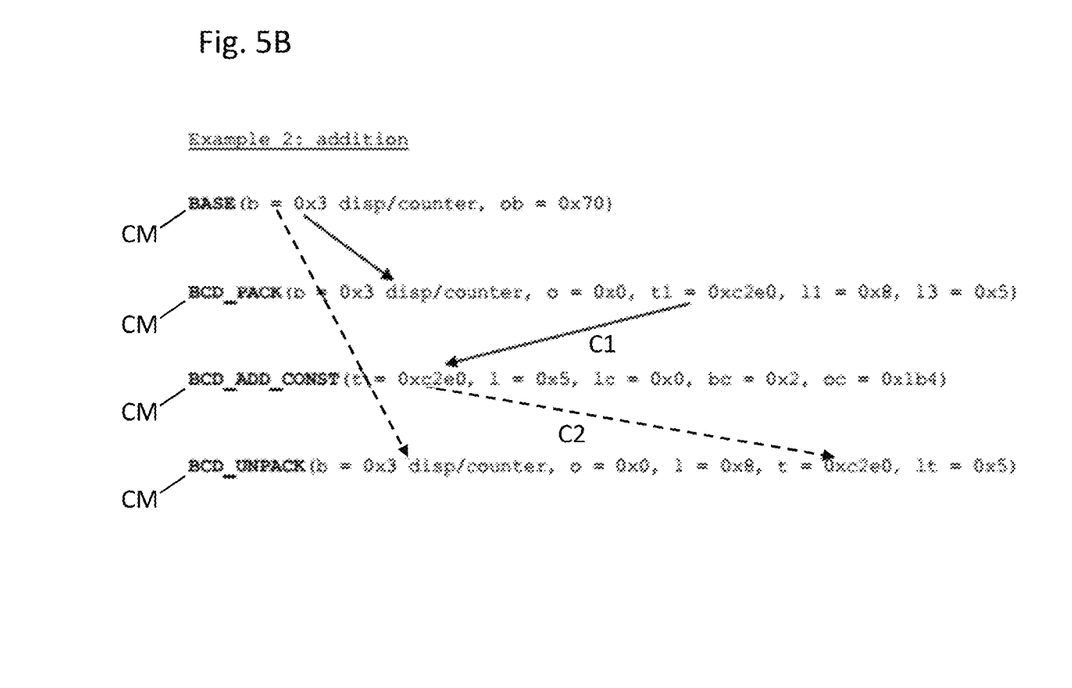

FIG. 5B shows in an equivalent way the dependencies for a second program construct, which concerns an addition of two values. Here, too, boundary conditions defined in the form of declarative rules must be observed so that the LR parser 47 can successfully assign the four parameterized tokens 46 shown or the corresponding code patterns to the program construct "addition".

In the example in FIG. 5B, two conditions C1 and C2 are checked, among others. The declarative and attributive parts of the associated rules can be represented as additional conditions of the reduction rules of grammar G. In the following, the respective conditions are indicated in double square brackets after the corresponding reduction rules:

| factor | : | lval BCD_PACK | [[ $$.oper = $2.t1; ]] |
|---|---|---|---|
| ; | | | |
| expr | : | factor | [[ $$.oper = $1.oper; ]] |
| ; | | | |
| expr | : | expr BCD_ADDCONST | [[ CHECK $1.oper == $2.t; $$.oper = $1.oper; ]] |
| ; | | | |
| asgn | : | expr BCD_UNPACK | [[ CHECK $1.oper == $2.t; ]] |
| ; | | | |

The above syntax with the symbols $$, $1 and so on is adapted to the syntax known from the Yacc/Bison projects, where $$ stands for the reduced non-terminal symbol, $1 and $2 for the first and second components of the construction rule respectively and the dot operator for an attribute of the respective terminal or non-terminal element of the intermediate language IL to be assigned or retrieved.

In a subsequent step S4 of the method 30, a hierarchical representation 48 of the program logic PL of the original computer program 1 is generated based on the assigned program constructs of the intermediate language IL. This representation can serve different purposes and can therefore also be very different.

Figure 6:
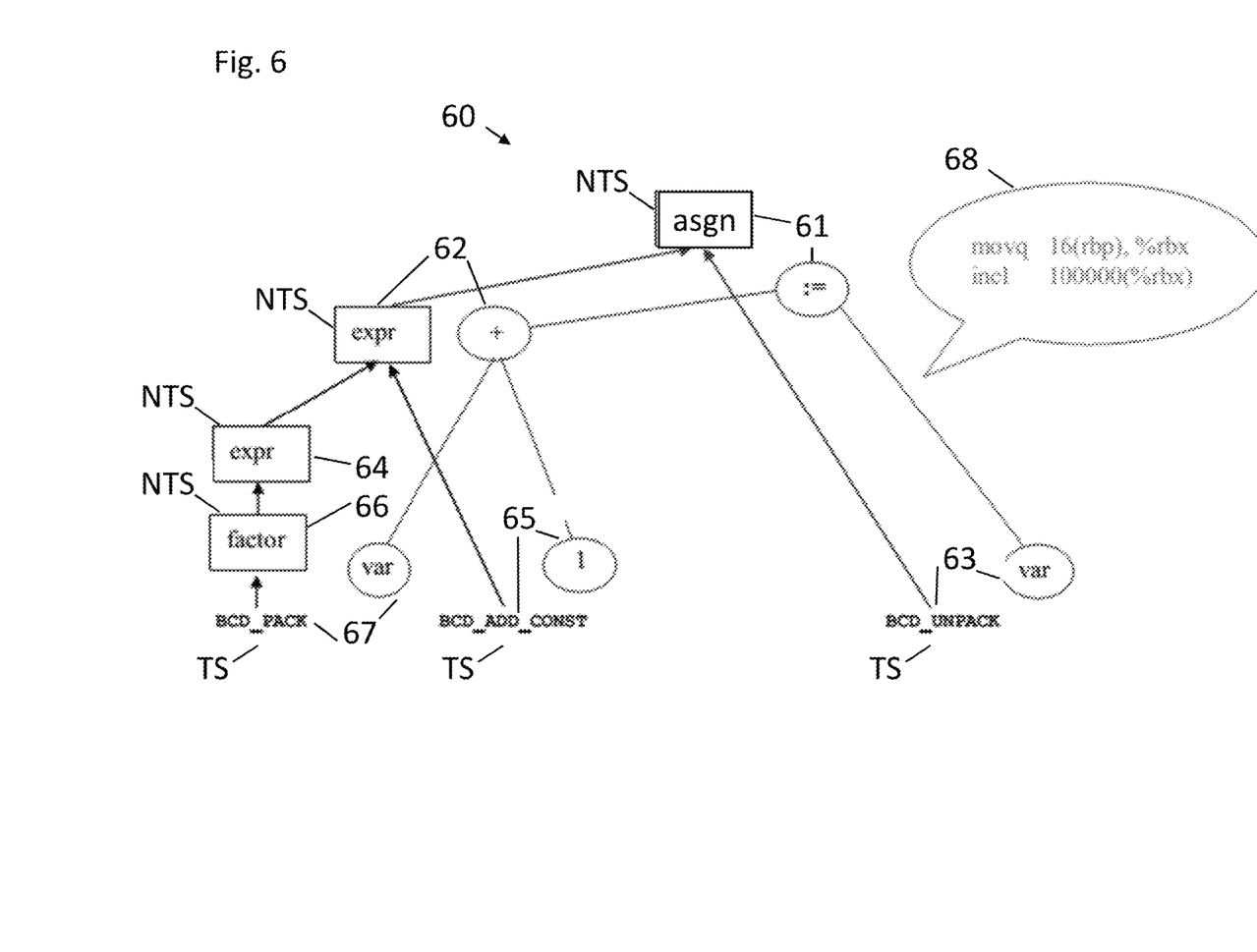
FIG. 6 shows a tree representation of a part of a reconstructed program logic.

According to a first variant S4.1, a syntax tree 60 of the non-terminal symbols NTS and the terminal symbols TS of the intermediate language IL as indicated in FIG. 6 can be output. FIG. 6 effectively shows the syntax tree 60 of the addition expression from the example in FIG. 5B. As can be seen in FIG. 6, the top-level addition corresponds to an assignment expression 61. By the assignment expression 61, the result of a lower-level addition expression 62 is assigned to a selected variable 63. The addition expression 62 is in turn composed of a further expression 64 and a constant 65. The further expression 64 represents a subordinate factor 66, which in turn contains a variable call 67 in the form of a code pattern BCD_PACK.

As can be seen in FIG. 6, the expressions 61, 62 and 64 as well as the factor 66 are embodied by non-terminal symbols NTS of the intermediate language IL. The assigned variable 63, the constant 65 and the variable call 67 are embodied by terminal symbols TS corresponding to the parameterized code patterns BCD_UNPACK for unpacking a BCD variable, BCD_ADD_CONST for adding a constant and BCD_PACK for packing a BCD variable.

Such a syntax tree 60 is particularly useful in checking the assignment of the individual parameters to the terminal symbols TS and non-terminal symbols NTS of the intermediate language IL.

In the example, the LR parser 47 generates the representation of a corresponding part of the program logic PL in the intermediate language IL from the list of tokens 46 by a so-called LALR(1) grammar (lookahead LR parser grammar). This effectively produces in the example a hierarchical representation 48 of a computer program 1 such as is shown in excerpt in FIG. 6 as syntax tree 60 for the addition expression shown in FIG. 5B. Although not shown in FIG. 6 for clarity, a hierarchical representation 48 of a complete program logic PL would have a root element program corresponding to a start symbol S of the intermediate language IL, from which the entire program logic PL of the original computer program 1 could be derived.

According to a second variant S4.2, a pseudo code representation of the recognized program constructs and recognized parameters can be output. Such a representation is particularly useful if the original source code of a computer program 1 has been lost, but an error in the original computer program 1 is to be corrected or the computer program 1 is to be further developed according to changed requirements. A programmer can use such a representation to see which functional blocks the computer program 1 passes through and thus regain the meaning of individual parameters with reasonable effort. In other words, such a representation is particularly helpful in maintaining undocumented or insufficiently documented computer programs 1 for which the original source code is no longer available, for example, so-called legacy code.

Advantageously, in the optional sub-step S4.3, the program logic PL in the intermediate language IL is translated into program code of a low-level programming language, for example, assembly or machine code, for a target platform TP. For this purpose, the x86 code generator 12 is used, which parses the hierarchical representation 48 of the program logic PL generated in step S4.1 and converts it into binary or assembler code 50 for an x86 processor without any runtime libraries such as for a screen output or time recording. Of course, other automatic code generation methods may also apply. Such translation enables efficient execution of a computer program 1 on a given target platform TP such as an x86 processor.

Based on a representation of a program logic PL in the intermediate language IL, for example, a complete syntax tree 60 of the program logic, it is relatively easy to generate binary or assembly code 50 for a target platform TP. If no optimization is to be performed, the binary or assembly code 50 can be generated directly by the individual elements of the hierarchical representation 48 of the program logic PL in the intermediate language IL. For example, the binary or assembly code 50 may be output by recursively parsing the syntax tree 60 starting at its root element.

Based on the assembly code 50 generated in this way, a completely executable assembly program 51 for the target platform TP can be generated, if necessary including standard libraries or further program parts, which comprises or includes the assembly code 50. The assembly code 50 or the assembly program 51 can then be converted into executable code 53 for an Intel x86 processor by an assembler 52 in a manner known per se.

Preferably, further optimization for a given target platform TP may take place before or during generation of the assembly code 50 or corresponding binary code. For example, a code optimizer 14 may be used to generate assembly code 50 optimized for execution on an x86 platform.

For example, the actual intention of the parameters used in the individual program constructs can be recognized in the representation of the intermediate language IL. Based on this, it can be analyzed whether the data formats used by the originally used compiler are necessary and suitable and optimal for the intended target platform TP. In the described example of a COBOL computer program 1, the COBOL compiler under investigation often uses so-called BCD variables to encode quite a few numerical values. BCD variables are also used, for example, as an index for accessing individual values of an array since the original S/390 platform offers very good technical support for processing BCD variables. In contrast, the x86 platform offers virtually no efficient, direct support for BCD variables. Accessing entries of an array by an index in the form of a BCD variable is thus a relatively complex operation that is not necessary from a technical point of view since permissible values for index variables are basically unsigned integers that can be represented as binary numbers without loss. Therefore, to improve the output assembly code 50, it is possible to recognize that a variable is an index variable based on the recognized constructs of the intermediate language IL, and change its data type according to the requirements of the target platform TP.

Specifically, the recompilation system automatically replaces 40 BCD variables with 64-bit-long integer variables if the value of the BCD variable is no more than 19 decimal places, no SRP (Shift and Round Packed BCD) instruction is applied to it to round the BCD number, the variable is used to access an array index or if a data flow analysis reveals that it is used as a loop or induction variable. In the above examples, replacing the data type originally used on the source platform SP with a different data type for the target platform TP results in no loss of accuracy. In other words, the program logic PL remains the same. However, the 64-bit-long integer variables used as a substitute can be processed much faster by an x86 processor.

In the example according to FIGS. 5B and 6, the S/390-specific machine code for reformatting the BCD variable is irrelevant for the semantics of the overall addition performed and consequently does not need to be mapped into corresponding machine code of a target platform TP. Accordingly, an efficient machine code for the target platform TP can be generated. FIG. 6 shows a corresponding, automatically generated x86 assembler code fragment 68 for the example according to FIG. 5B.

Other possible optimizations concern the distinction between local and global variables, the calling of subfunctions, prologues, epilogues or individual sections (or buckets) of procedures, conditional jumps and the loading of basic registers, which can be replaced by corresponding machine commands of the target platform ZP without changing the program logic PL.

The invention claimed is:

1. A method of generating a representation of a program logic in an intermediate language, comprising:
    capturing first program code in a low level programming language for a first processor architecture, the first program code implementing a program logic and having been generated by compiling the program logic defined in a high level language with a compiler;
    dividing the captured first program code into a sequence of code sections based on a predetermined set of at least partially parameterized code patterns specific to the compiler, wherein for each code section, specific parameter values for each parameter of a corresponding parameterized code pattern are captured and a terminal symbol of the intermediate language is assigned to each code section;
    assigning the terminal symbols assigned to the sequence of code sections to non-terminal symbols of the intermediate language based on a context-free grammar of the intermediate language, wherein a totality of the assigned non-terminal symbols describes the program logic of the first program code in the intermediate language; and
    generating a representation of the program logic independent of the first processor architecture based on the assigned non-terminal symbols of the intermediate language and the parameter values captured in the step of dividing,
    wherein, in the step of assigning, at least one context-dependent condition for a non-terminal symbol of the intermediate language is checked based on the parameter values captured in the step of dividing and a possible assignment to the non-terminal symbol is rejected as incorrect if the at least one context-dependent condition is not fulfilled by detected parameter values of corresponding code sections.

2. The method according to claim 1, wherein in the step of dividing, the code sections of the first program code are compared by pattern matching with the predetermined set of at least partially parameterized code patterns specific to the compiler, and a corresponding terminal symbol is assigned only if a consistent assignment of parameter values for each parameter of a corresponding parameterized code pattern is possible for examined code section.

3. The method according to claim 1, wherein, in the step of assigning, a sequence of terminal symbols assigned to the sequence of code sections is converted by a parser or a bottom-up parser, into a hierarchical representation of the program logic, wherein higher-level elements of the hierarchical representation correspond to the non-terminal symbols of the intermediate language and exclusively lower-level elements of the hierarchical representation correspond to the terminal symbols of the intermediate language.

4. The method according to claim 3, wherein the hierarchical representation is a syntax tree, and leaves of the syntax tree comprise first attributes in which the parameter values captured in the step of dividing are stored.

5. The method according to claim 3, wherein the hierarchical representation is a syntax tree, and nodes of the syntax tree comprise second attributes in which parameter values derived from the captured parameter values are stored in the step of assigning.

6. The method according to claim 1, wherein, in the step of generating, second program code is generated in a low level programming language for a second processor architecture based on associated non-terminal symbols of the intermediate language, and upon execution of the second program code on a processor having the second processor architecture program, steps are executed according to the program logic defined in the high level language.

7. The method according to claim 6, wherein optimized second program code for the second processor architecture is generated in the step of generating.

8. The method according to claim 7, wherein generating optimized second program code comprises analyzing the data types used by the first program code and replacing at least one first data type specific to the first processor architecture with at least one second data type.

9. The method according to claim 1, wherein the intermediate language is a closed, context-sensitive language.

10. The method according to claim 1, wherein the non-terminal symbols of the intermediate language are characteristic of a plurality of imperative higher programming languages.

11. The method of claim 10, wherein the intermediate language comprises non-terminal symbols for program constructs of the plurality of imperative higher programming languages: Checking a condition; Conditionally executing a program section; Evaluating an arithmetic expression; Assigning a value to a variable; Calling another program section; Calling a subroutine, if applicable; Returning from a subroutine; and Traversing a program loop.

12. The method according to claim 1, wherein the predetermined set of at least partially parameterized code patterns comprises at least one of code patterns: determining a base address; storing a parameter and/or a parameter list; accessing an array variable; determining an array index; storing a passed parameter value; packing, unpacking, formatting, matching, adding, comparing or copying a binary coded decimal variable; and jumping to or from a subroutine.

13. The method according to claim 1, wherein the parameterized code patterns comprise at least one of: a base register; an offset value; a temporary address; a length specification; a condition code; a register containing an address of a variable; and a jump address.

* * * * *